United States Patent
Negele et al.

(12)
(10) Patent No.: US 6,221,439 B1
(45) Date of Patent: *Apr. 24, 2001

(54) METHOD FOR APPLYING A COATING FILM ON A THREE-DIMENSIONALLY CURVED SUBSTRATE

(75) Inventors: Oswin Negele, Korb; Karl Holdik, Ulm, both of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/898,042

(22) Filed: Jul. 18, 1997

(30) Foreign Application Priority Data

Jul. 18, 1996 (DE) .............................. 196 28 966

(51) Int. Cl.[7] ...................................... C08J 7/18

(52) U.S. Cl. ......................... 427/514; 156/152; 156/230; 156/272.2; 156/278; 156/289; 156/307.3; 427/207.1; 427/385.5; 427/407.1; 427/508; 427/516; 427/558; 427/559

(58) Field of Search ..................................... 427/508, 516, 427/514, 558, 559, 207.1, 385.5, 407.1; 156/152, 230, 272.2, 278, 289, 307.3

(56) References Cited

U.S. PATENT DOCUMENTS

| 4,766,038 | 8/1988 | de Vroom | 428/447 |
|---|---|---|---|
| 5,387,304 | 2/1995 | Berner et al. | |

FOREIGN PATENT DOCUMENTS

| 0210620 | 2/1987 | (EP) . |
|---|---|---|
| 0251546 | 1/1988 | (EP) . |
| 0 361 351 | 4/1990 | (EP) . |
| 0361351 | 4/1990 | (EP) . |
| 0 395 228 | 10/1990 | (EP) . |
| 0 635 348 | 1/1995 | (EP) . |
| 2-127025 | 5/1990 | (JP) . |
| 5-49480 | 7/1993 | (JP) . |
| 6-277617 | 10/1994 | (JP) . |
| 7-32891 | 4/1995 | (JP) . |
| 7-79987 | 8/1995 | (JP) . |
| 8-143755 | 6/1996 | (JP) . |

OTHER PUBLICATIONS

Japanese Patent Office Action with Translation (No Date Avail.).

Primary Examiner—Bernard Pianalto
(74) Attorney, Agent, or Firm—Evenson, McKeown, Edwards & Lenahan, P.L.L.C.

(57) ABSTRACT

The invention relates to a process for applying coating films to three-dimensionally curved substrates, and to a process for producing coating films. In order to apply the coating film, which has at least a coating layer and an adhesive layer, the radiation-curable coating layer of the coating film is partially cured so as to be free from tack before being applied to the substrate. Following application, the coating film is subjected to electromagnetic radiation at below the wavelength of the visible spectrum and is fully cured. To produce a coating film, the coating layer is partially cured so as to be free from tack and in this state is stored until it is applied to a substrate. The coating layer can be attached at least indirectly to a smooth support base in conjunction with an adhesive layer. The coating layer and/or the coating film can be detached from a roller in applying the coating film to a substrate.

30 Claims, 3 Drawing Sheets

METHOD FOR APPLYING A COATING FILM ON A THREE-DIMENSIONALLY CURVED SUBSTRATE

This application claims priority of German application 196 28 966.1, filed Jul. 16, 1996, the entire contents of which are expressly incorporated herein by reference.

BACKGROUND AND SUMMARY OF THE INVENTION

The invention relates to a method for applying a coating film to three-dimensionally curved surfaces of a dimensionally stable substrate and the coating films.

A process for coating three-dimensionally curved surfaces of dimensionally stable substrates with a coating film is known from patent document EP 361 351 A1. The coating film used there is formed by a supporting film, an adhesive layer, and a coating layer. Before applying the coating film, the radiation-curable coating layer is partially cured so that it is dust-dry. The coating film is then heated and drawn over the substrate that, if appropriate, has also been heated. After application of the coating film is complete, the coating layer is fully cured by thermal means. A hardening reaction between the adhesive layer, the coating layer, and the substrate may simultaneously occur.

In certain circumstances, different materials in a substrate must be coated independently. For example, transitions between sheet-metal components and plastic components on the body of a passenger car or in a motor vehicle interior are separately coated. This is because the high thermal loading conditions used for metals that are unsuitable for plastic. Unfortunately, the use of different coating films on different materials or surfaces may result in a different coating appearance.

Furthermore, the coating films have a supporting film which—when the supporting film is arranged centrally—remains on the product or—if the supporting film is arranged on the outside—is detached and if appropriate recycled following application of the coating film. In both cases, expenditure on the material is high, as a result of which the mass of the coating film to be used for coating and also the production costs are high.

An object of the invention is to provide better methods for applying coating films that are more universally applicable. Furthermore, an object of the invention is to provide a cost-effective coating film capable of being used in coating curved substrates.

The invention provides a method for coating a three-dimensionally curved surface of a dimensionally stable substrate. The method comprises applying a coating film to the substrate and subjecting the coating film to electromagnetic radiation below the visible spectrum. In addition, the invention provides a coating film comprising two layers: a coating layer having a partially cured, radiation-curable polymer; and an adhesive layer. The composition of the coating layer and the adhesive layer can be selected from the numerous polymeric coating and adhesive materials known in the art, such as those discussed in European patent document EP 0 361 351 and in the Concise Encyclopedia of Polymer Science and Engineering, Wiley Interscience, New York, both of which are specifically incorporated herein by reference.

In one embodiment, the coating film is heated to the glass transition temperature or slightly above the glass transition temperature of the polymer selected. The substrate can also be heated to that temperature. For example, the polymer of the coating layer can be selected as one having a glass transition temperature of below about 40° C., or preferably below about 30° C.

In other embodiments, the coating layer comprises a multi-layer structure having an outside layer comprising a fully cured clearcoat. The outside layer being the layer of the coating film that, after the coating film is applied to the substrate, is most external to the substrate or is in contact with the environment. The layers of the multi-layer structure may comprise numerous materials known in the art as appropriate for coating films. For example, a layer of the multi-layer structure can comprise a colored thermoplastic polymer material in the thermoplastic state. In addition or alternatively, the outside layer can comprises a fully cured thermosetting polymer and/or a binder material.

Numerous appropriate binder materials are known in the art and can be used in this invention. Preferred binder materials comprises one or more of the group consisting essentially of phosphazene, a phosphazene resin, a phosphazene derivative, a phosphazene intermediate, a urethane, a urethane derivative, a urethane intermediate, an acrylate, an acrylate derivative, and an acrylate intermediate.

In other embodiments, the method employs a coating film or coating film apparatus comprising a support base. The support base can be detached from the coating film, or vice versa, prior to applying the coating film to the substrate. The support base can be a film or a surface on which the coating layer, the adhesive layer, or a component of the coating film is stored. Also, the adhesive layer can be added to the coating film before the support base detaches from the coating film. Or, the adhesive layer can first be attached to the support base and thereafter the coating layer can be attached to the adhesive layer.

In other embodiments, the coating film contains a support base. Numerous support bases are known in the art and can be used in the invention. The adhesive layer and a pre-cured coating layer can be attached to a support base so that, for example, the coating layer is partially cured after being detached from the support base. Also, the coating layer can be partially cured while attached to a support base. In addition, the adhesive layer can be attached to the coating layer after the coating layer is detached from the support base.

In more detailed aspects, the substrate is subjected to at most a slight load by the full curing by means of the electromagnetic radiation within the claimed wave range. It should be noted here that if the coating layer is fully cured by means of electron beams, the wave image of the electron beams, i.e. with regard to their wavelengths, should be considered.

In particular, a coating film having only a coating layer and an adhesive layer is also beneficial since it is possible to dispense with the supporting film, which has hitherto been present and which is therefore no longer required. Thus, a supporting film arranged on the outside no longer has to be detached separately from the substrate.

In addition, the invention is explained in more detail with reference to exemplary embodiments illustrated in the figures. Other objects, advantages and novel features of the invention will become apparent from the following detailed description of the invention and when considered in conjunction with the accompanying drawings.

DETAILED DESCRIPTION OF EMBODIMENTS OF THE INVENTION

Figure 1:
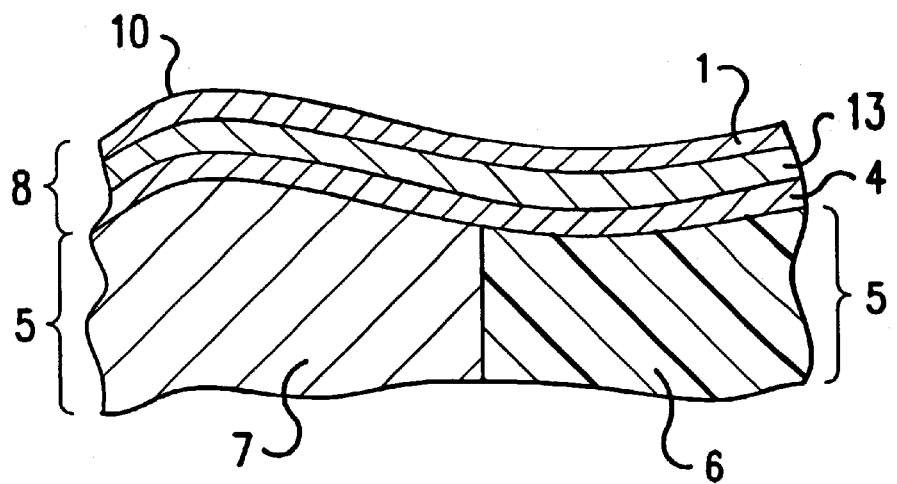
FIG. 1 shows a detailed enlargement of a coating film which has been applied to a substrate.

FIG. 1 illustrates a three-dimensionally curved substrate 5 comprising a plastic part 6 and a sheet-metal part 7, in particular of a body of a passenger car, onto which substrate a coating film 8 has been applied.

The coating film 8 is formed by a coating layer 1 and an adhesive layer 4. It is preferred to use a reactivatable adhesive for the adhesive layer 4, since as a result it is simple to store temporarily the entire coating film 8, for example as a roll 9 (FIGS. 2 and 3), prior to its application to a substrate 5.

If appropriate, the coating film 8 may additionally have a supporting film 13, which has a stabilizing effect and in the present case is arranged centrally, that is to say between the adhesive layer 4 and the coating layer 1. However, depending on the application the supporting film 13 may also be arranged on the outside, that is to say towards the visible side 10.

Prior to the application of the coating film 8 and prior to its intermediate storage as a roll 9, the radiation-curable coating layer 1 is partially cured so as to be free from tack and dust-dry. The partial curing may in this case be carried out by radiation 2, such as infrared, heat, ultraviolet and/or electron-beam radiation.

In order for the coating film 8, which has a partially cured coating layer 1, to be applied to the substrate 5, which is produced from different materials, such that it is free of blisters, folds and the orange-peel effect, it is advantageous to preheat the coating film 8 and/or the substrate 5.

It has proved beneficial here to select for the coating layer 1 a coating which has a glass transition temperature of below 40° C., in particular below 30° C., so that, in order to apply the coating film 8 to the substrate 5, the coating layer 1 can be heated to its glass transition temperature or slightly above its glass transition temperature.

It is sensible to select the heating temperature during application such that the coating film 8 can be applied elastically. Preferably, the heating temperature is at the same time made to be below a critical temperature for the substrate 5, at which temperature there may be some form of destruction with regard to the material of the substrates and/or softening of the material of the substrate 5, resulting in, for example, deformation.

This selection of materials for the coating film 8 with regard to the heating temperature ensures that the substrate 5 is not permanently thermally impaired or destroyed. This measure makes it possible, in particular, to provide substrates 5 made of different materials with the same coating film 8, as a result of which the substrate 5 has the same color appearance over the entire surface of the substrate 5.

For full curing, the coating film 8, which is applied elastically and preferably taut to the substrate 5, is exposed to an in particular electromagnetic radiation 2, the wavelength of which is below that of the visible spectrum. This definition is also understood to include electron beams which, owing to the wave-corpuscle duality present in the wave area, are to be considered in terms of their wavelength.

The coating layer 1 is fully cured or fully crosslinked by means of the radiation 2. This manner of fully curing the coating layer 1, expediently with the simultaneous radiation curing of the adhesive layer 4, which is in particular activatable, means that the materials of the substrate are at most subjected to slight loading.

Furthermore, this manner of partial and full curing of the coating layer 1 makes it possible for the coating film 8 to be applied thermoplastically and, once applied, to be crosslinked by thermosetting.

The following text gives details of the production of a supporting-film-free coating film 8, which is particularly beneficial for the above mentioned application. A detail of an apparatus for producing a coating film 8 of this kind is illustrated in FIGS. 2 and 3.

Figure 2:
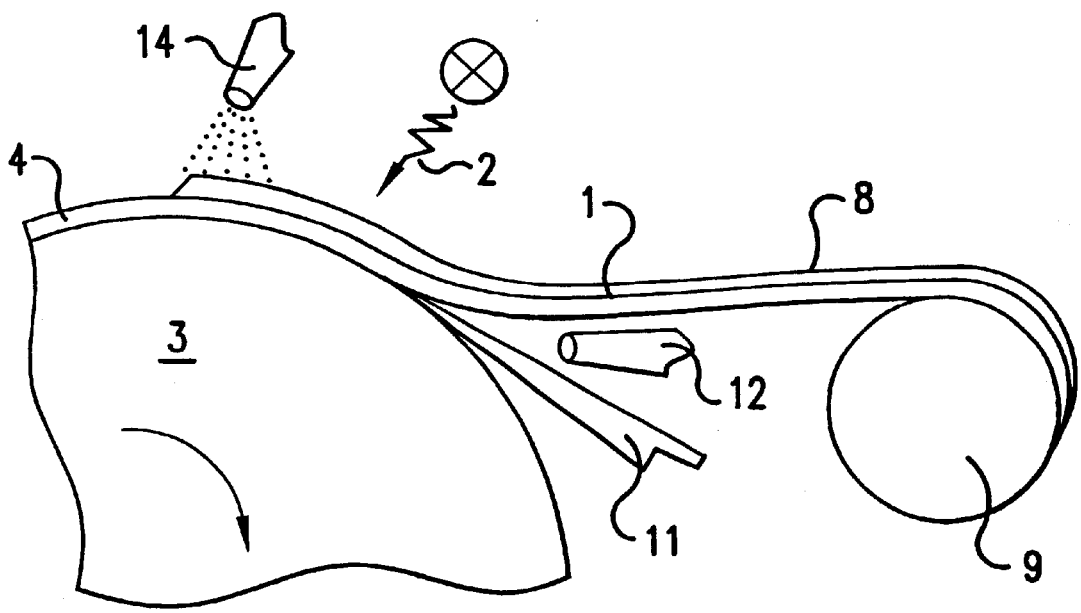
FIG. 2 shows a detail of an apparatus for producing a coating film according to the invention, in the case of which the adhesive layer is first applied to the support base.
Figure 3:
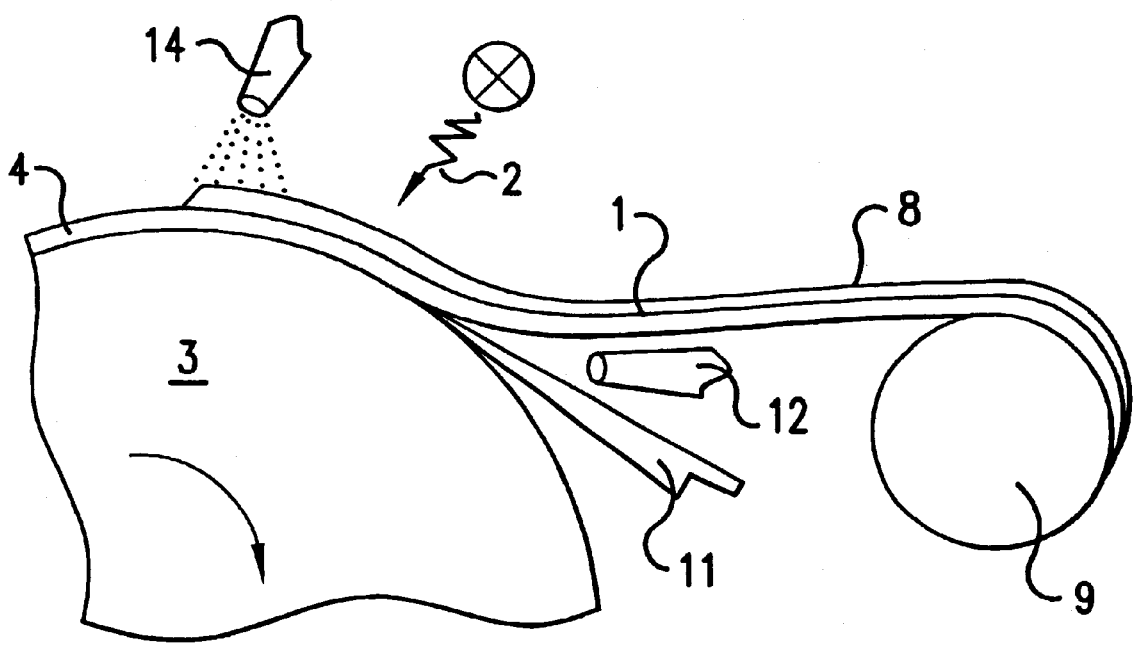
FIG. 3 shows a detail of an apparatus for producing a coating film according to the invention, in the case of which the coating layer is applied first to the support base.

One of the differences between the two illustrations in accordance with FIGS. 2 and 3 is that in the case of the apparatus in accordance with FIG. 2 the adhesive layer 4 is applied first to the support base 3, while in the case of the apparatus in accordance with FIG. 3 the coating layer 1 is laid down first.

The apparatus, which in structural terms are approximately identical, have an endlessly revolving support base 3 which, as in the present cases, is formed by the polished surface of a revolving roller. As an alternative, the support base 3 may also be formed by a revolving conveyor belt with a smooth surface. As explained below, producing the apparatus to apply the appropriate coating can be achieved in various ways.

In accordance with FIG. 1, the adhesive layer 4 is applied to the outer surface, which forms the support base 3, of the roller by being, for example, rolled on or sprayed on (not shown), which adhesive layer is formed in particular from an activatable hot-melt adhesive. The coating layer 1 is then applied to the adhesive layer 4. In the present exemplary embodiment, the coating layer 1 is applied with the aid of the spraying nozzle 14. The coating layer 1 is partially cured or partially crosslinked during and/or after application and by heating. The partial curing of the coating layer 1 is performed until the coating layer 1 is free from tack or until it is dust-dry.

The coating layer 1 can be applied to the adhesive layer 4 while the adhesive layer 4 is still situated on the support base 3. If the adhesive layer 4 is sufficiently stable, the coating layer 1 can also be applied to the adhesive layer 4 when the adhesive layer 4 has already been detached from the support base 3.

In both cases, the partial curing of the coating layer 1 can be carried out once the coating film 8 has been detached. If the coating layer 1 has been applied in the region of the support base, it is sensible to carry out the partial curing while the coating film 8 is still arranged on the support base 3. The particular procedure depends on various factors, such as for example the stability of the adhesive layer 4, inter alia.

In FIG. 3, for the purpose of producing the coating film 8, the coating layer 1 is first laid onto the support base 3. If this procedure is adopted, it is important, inter alia, for the support base 3 to have a high quality, i.e. to be polished, for example. As above, the second layer of the coating film 8, in this case, therefore, the adhesive layer 4, can then be applied to the partially cured or partially crosslinked coating layer 1. Depending on the stability of the coating layer 1, the partial curing can take place while still on the support base 3 or else when the coating layer 1 has already been detached from the support base 3.

In order to detach the coating layer 1 and/or the adhesive layer 4 and/or the adhesive layer 4 provided with a coating layer 1, the apparatus illustrated in FIGS. 2 and 3 have a scraper 11.

Instead of removing the covering (coating film 8 or adhesive layer 4 or coating layer 1) applied to the support base 3 by means of the scraper 11, or else to assist the scraper 11, the apparatus may also have a blowing device (illustrated by the nozzle 12). The blowing device assists the removal of the respective covering by means of the scraper 11, or is provided to detach the covering by itself.

Heated compressed air is advantageously used to detach the covering by means of the blowing device, since it is then simultaneously possible partially to dry the coating layer 1 and/or the activatable adhesive layer 4.

By contrast to, or in addition to, the nozzle 12 illustrated in FIGS. 2 and 3, the blowing device may also be realized by forming the support base 3 from a porous material, through which compressed air is blown onto the underside of the covering to be detached. After detachment from the support base 3, the coating film can be applied to a substrate or stored on a roll 9.

It is particularly advantageous if phosphazene and/or phosphazene resin and/or derivatives thereof and/or intermediates thereof are used as binder for the coating layer 1 or, in the case of a multi-layer structure of the coating layer 1, at least for the outside layer thereof.

In addition to being easy to process during production and application to substrate 5, coating films 8 of this kind also have an excellent scratch resistance.

Furthermore, these coating films 8 may be produced with good environmental compatibility, so that measures required to protect the environment are substantially reduced. Furthermore, these coating films can also be produced cost-effectively.

A further advantage of these coating films 8 which should be noted is that they are thermoplastic after the partial curing, while after full curing—after the coating film 8 has been applied—they can be crosslinked as thermosets. Once they have been finally applied, therefore, the coating films can be ground and polished. In the event of minor damage, the ability to be ground and polished offers the advantage that the substrates coated with coating films of this kind are easy to repair by minor touching up.

This fact is beneficial preferably when coating films 8 of this kind are used as high-quality decorative films, since the latter hitherto generally had to be produced in a cost-intensive and ecologically harmful manner from fluorothermoplastics (e.g. PVDF). Furthermore, coating films based on PVC and PVDF cannot be ground and polished, and are therefore also impossible to repair over small areas.

Furthermore, in the event of a lower scratch resistance of the coating film 8, it may be sensible to select urethane and/or the derivatives thereof and/or the intermediates thereof as binder for the coating layer 1 or, in the case of a multi-layer structure of the coating layer 1, at least for the outside layer thereof.

A further possibility is to select acrylates and/or the derivatives thereof and/or the intermediates thereof for the binder.

Figure 4A:
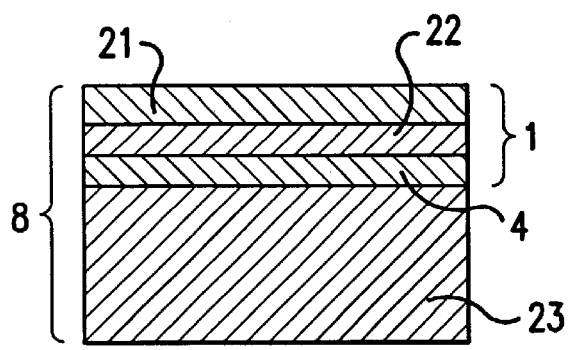
FIGS. 4 a,b,c,d,e and f show a coating film for thermoforming and a plurality of process steps of an associated process for foam-backing or backing by injection molding this coating film.

FIG. 4a illustrates a coating film 8 which is suitable for foam-backing or backing by injection molding with plastic.

The coating film 8, which is preferred for a process of this kind, in accordance with FIG. 4a has the following layer structure: the outer layer 21 on the visible side consists of clearcoat, the next layer 22 is a layer which provides color and/or effect, the next layer is an adhesive layer 4 and the final layer, that is to say the layer which faces towards the injection-molded backing, is a layer 23 of material which, when the backing material is injection molded, can be joined, in particular monolithically, to the backing material to be injection molded, without the addition of further substances. This material layer 23 is preferably produced from the same material as the backing material to be injection molded.

Figure 4B:
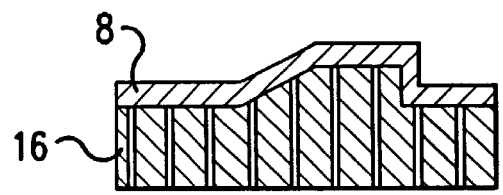
Figure 4C:
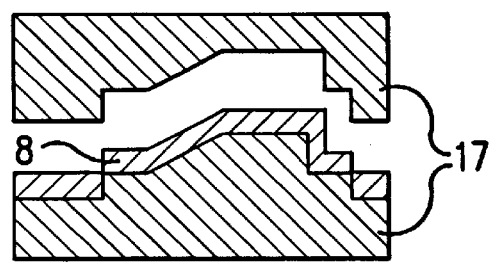
Figure 4D:
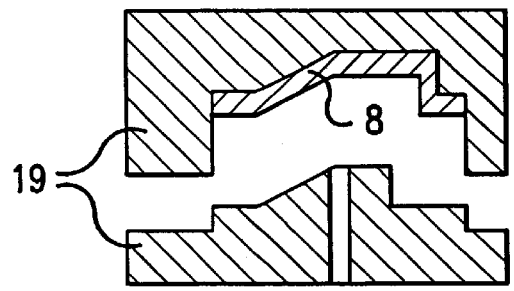
Figure 4E:
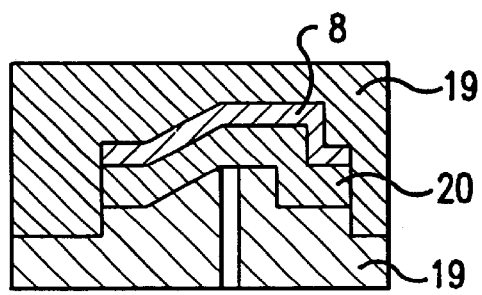
Figure 4F:
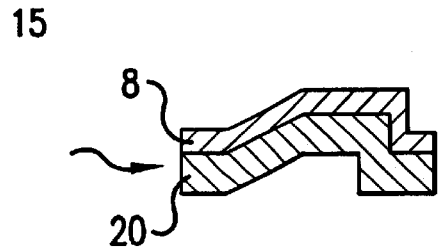

The further FIGS. 4b, 4c, 4d, 4e and 4f illustrate a plurality of process steps of the associated process for producing an object which is decorated with a coating film 8 and backed by injection molding (see FIG. 4f).

In FIG. 4b, the coating film is heated thermally, preferably to a temperature in the region of the glass transition temperature of the coating layer 1 of the coating film 8, and is thermoformed in particular permanently and without creases, over a male die 16 by means of vacuum. As illustrated in FIG. 4c, the thermoformed coating film 8 is stamped out in a stamping die 17 to match a desired contour.

The stamped and thermoformed coating film 8 is placed in an injection mold 19 and backed by injection molding with a plastic 20 (FIG. 4e). The backing is expediently carried out in the region of the glass transition temperature of the coating layer. In order to form the object, which is to be produced with an injection molded backing and in the ready-decorated state, with the correct shape, when the backing is being carried out the elastic coating film 8 can simultaneously be pressed against the limits of the injection mold 19, which are formed as a negative image of the desired shape of an object 15 (FIGS. 4d–4f). After curing the injection-molded plastic backing 20, the ready-decorated object is detached from the injection mold 19 and the coating film 8 is cured by thermosetting by means of radiation curing.

In the case of a multi-layer structure of the coating layer 1, as illustrated in FIG. 4a, it is possible to cure only the outer layer 21, which in this case is formed from clearcoat, in which case a layer 22, which provides color and/or effect, of the coating layer 1 remains thermoplastic. A layer which provides effect is to be understood in particular as being those layers which have liquid-crystal substances which are three-dimensionally crosslinked in an oriented manner and have a chiral phase, which pigments give the effect of being a different color depending on the viewing angle. Pigments of this kind are known, in particular, from EP 601 483 B1. This is useful, inter alia, because radiation curing of the layer 22 which provides color and/or effect is costly in terms of equipment.

If it is nevertheless intended to cure the layer which provides color and/or effect likewise as a thermoset, the full curing of the layer 22 which provides color and/or effect is preferably carried out by means of electron beams.

In a process of this kind, the coating film 8 illustrated in FIG. 4a is particularly useful. The layer structure of the coating film is as follows: clearcoat, color and/or effect layer, if appropriate adhesive layer and finally, i.e. facing the injection-molded backing, a layer of material which, when the backing material is injection molded, can be joined, in particular monolithically, to the backing material to be injection molded, without the addition of further substances. This material layer is preferably produced from the same material as the backing material to be injection molded.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for coating a three-dimensionally curved surface of a dimensionally stable substrate, comprising:

forming a film comprising a radiation curable coating layer and an adhesive layer;

partially curing the coating layer of the film;

applying the partially cured film to the three-dimensionally curved surface of the dimensionally stable substrate, wherein said substrate comprises a plurality of different materials; and subjecting the partially cured film on the three-dimensionally curved surface of the dimensionally stable substrate to electromagnetic radiation at a wavelength below the visible spectrum to fully cure the film.

2. The method according to claim 1, wherein at least one material of said plurality of different materials is a heat sensitive material.

3. The method according to claim 2, wherein said plurality of different materials comprises at least two heat sensitive materials, wherein thermal loading conditions of at least one of the materials is different from thermal loading conditions of the remaining materials.

4. The method according to claim 3, further comprising subjecting the at least two heat sensitive materials having the partially cured film thereon to electro-magnetic radiation at a wavelength below the visible spectrum to simultaneously fully cure the film.

5. A method as claimed in claim 1, wherein the coating layer comprises a polymer and is heated to the glass transition temperature or above the glass transition temperature of the polymer.

6. A method as claimed in claim 1, wherein the polymer of the coating layer has a glass transition temperature of below 40° C.

7. A method as claimed in claim 1, wherein the coating layer comprises a multi-layer structure having an outside layer comprising a fully cured clearcoat.

8. A method as claimed in claim 7, wherein at least one layer of the multi-layer structure comprises a colored thermoplastic polymer material in a thermoplastic state.

9. A method as claimed in claim 7, wherein the outside layer comprises a fully cured thermosetting polymer.

10. A method as claimed in claim 9, wherein the outside layer further comprises a binder material.

11. A method as claimed in claim 10, wherein the binder material comprises one or more of the group consisting essentially of phosphazene, a phosphazene resin, a phosphazene derivative, a phosphazene intermediate, a urethane, a urethane derivative, a urethane intermediate, an acrylate, an acrylate derivative, and an acrylate intermediate.

12. A method as claimed in claim 11, wherein the coating film further comprises a support base, and wherein the support base is detached from the coating film prior to applying the coating film to the substrate.

13. A method as claimed in claim 11, wherein the adhesive layer is added to the coating film before the support base detaches from the coating film.

14. A method as claimed in claim 11, wherein the adhesive layer is first attached to the support base and thereafter the coating layer is attached to the adhesive layer.

15. A method as claimed in claim 11, wherein the adhesive layer and a pre-cured coating layer are attached to a support base, and wherein the coating layer is partially cured after the being detached from the support base.

16. A method as claimed in claim 11, wherein the coating layer is partially cured while attached to a support base.

17. A method as claimed in claim 16, wherein the adhesive layer is attached to the coating layer after the coating layer is detached from the support base.

18. A method as claimed in claim 1, wherein the coating film further comprises a supporting base, and and said method further comprises detaching the support base from the coating film prior to applying the coating film to the substrate.

19. A method as claimed in claim 18, wherein the adhesive layer is added to the coating film before the support base detaches from the coating film.

20. A method as claimed in claim 18, wherein the adhesive layer is first attached to the support base and thereafter the coating layer is attached to the adhesive layer.

21. A method as claimed in claim 1, wherein the adhesive layer and a pre-cured coating layer are attached to a support base, and wherein the coating layer is partially cured after the being detached from the support base.

22. A method as claimed in claim 1, wherein the coating layer is partially cured while attached to a support base.

23. A method as claimed in claim 22, wherein the adhesive layer is attached to the coating layer after the coating layer is detached from the support base.

24. The method according to claim 1, wherein said plurality of different materials comprises a metal material and a plastic material.

25. The method according to claim 1, wherein said partially curing is by infrared radiation.

26. The method according to claim 1, wherein the partially cured film is applied elastically.

27. The method according to claim 1, wherein said partially cured coating layer is tack-free and dust-dry.

28. A method for coating a three-dimensionally curved surface of a dimensionally stable substrate, comprising:

forming a film comprising a radiation curable coating layer and an adhesive layer;

partially curing the coating layer of the film, thereby obtaining a tack-free and dust-dry coating layer;

applying the partially cured film elastically to the three-dimensionally curved surface of the dimensionally stable substrate, wherein said substrate comprises a plurality of different materials; and subjecting the partially cured film on the three-dimensionally curved surface of the dimensionally stable substrate to electro-magnetic radiation at a wavelength below the visible spectrum to fully cure the film.

29. A method according to claim 28, wherein said partially curing is by heat.

30. A method for coating a three-dimensionally curved surface of a dimensionally stable substrate, consisting of:

forming a film comprising a radiation curable coating layer and an adhesive layer;

applying the film to the three-dimensionally curved surface of the dimensionally stable substrate, wherein said substrate comprises a plurality of different materials; and subjecting the film on the three-dimensionally curved surface of the dimensionally stable substrate to electro-magnetic radiation at a wavelength below the visible spectrum to cure the film.

* * * * *